Dec. 6, 1955   A. V. E. C. GUILBERT   2,726,345
THREE-BRUSH DYNAMO
Filed Dec. 26, 1950

Inventor:
A. V. E. C. Guilbert
By Wenderoth, Lind & Ponack
Attorneys

United States Patent Office 2,726,345
Patented Dec. 6, 1955

2,726,345

THREE-BRUSH DYNAMO

André Vincent Ernest Cyrille Guilbert, Bourg-la-Reine, France

Application December 26, 1950, Serial No. 202,641

Claims priority, application France December 18, 1946

2 Claims. (Cl. 310—187)

This application is a continuation in part of my former patent application Serial No. 790,875, filed on December 10, 1947, now abandoned, for "Improvements in Electric Current Generators" and certain parts of this application will be found in this former patent application.

This invention relates to improvements in the construction and arrangement of dynamos of the "three-brush" type.

When a three-brush or similar dynamo is connected in parallel with a constant-voltage current source, for instance a storage battery, it is already known to connect in parallel with the first consuming circuit, comprising the self-regulating voltage-current system resulting thereby, another consuming circuit having connected in series therein a compensating winding fixed on the field poles of the dynamo, a suitable make-and-break device being mounted preferably to the very terminals of the dynamo. An arrangement of this kind has been described and illustrated in the U. S. Patent No. 2,084,527 to same applicant. In this patent the compensating winding was advantageously made of a single coil per pole, located in a notched portion thereof on the side of the leading pole horn.

The object of this invention is to provide a simplified construction of a "three-brush" dynamo of the type disclosed hereinabove, in view of facilitating the manufacture of the compensating winding and improving the electrical insulation of the assembly. With this object in view, instead of inserting the compensating winding in a slot formed in the pole piece, which involves during the winding step the necessity of running the wire several times through the slot with the risk of deteriorating the insulating coating thereof, the pole piece consists of two separate members fixed respectively on the carcase or casing of the machine, one of these members being positioned in the region of the leading pole horn and carrying the compensation winding which may be wound outside the machine before mounting it on this pole piece.

In the case of high-output dynamos each pole piece is constructed in the above defined manner and the main field winding consists of a coil wound both on the aforesaid two pole piece members and on the compensating winding carried by one of these pole piece members.

In low-output dynamos the field winding and the compensating winding are mounted preferably with consequent poles, i. e. every other pole is provided with a field winding while only those poles which are deprived of said field windings carry a compensating winding.

The drawings attached to this specification and forming part thereof illustrate diagrammatically by way of example some practical embodiments of the invention described hereunder. In the drawings.

Figure 2:
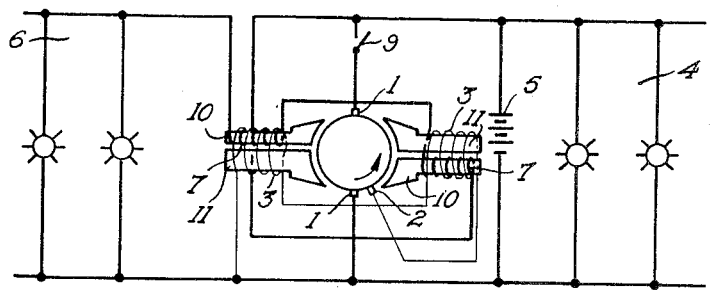
Fig. 2 is a wiring diagram of an installation using a dynamo of the type illustrated in Fig. 1.

Referring first to Fig. 2 the dynamo comprises main brushes 1, a "third" brush 2 and field windings 3. In a first consuming circuit 4 this dynamo is connected in parallel with a storage battery 5. In addition, another consuming circuit 6 is provided having mounted in series therein a compensating winding 7. A make-and-break device 9 is also provided for disconnecting the dynamo from both circuits 4 and 6.

Figure 1:
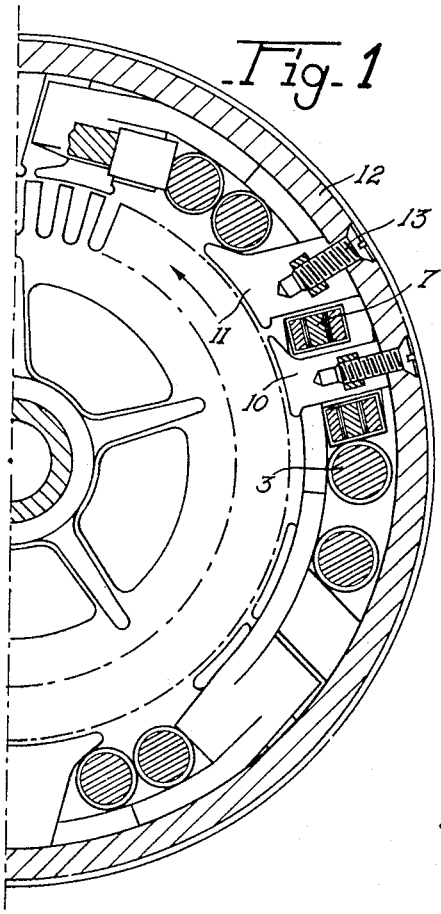
Fig. 1 is a diagrammatic cross-sectional view of a "three-brush" dynamo constructed in accordance with the teachings of this invention and having a relatively high nominal power.

In the embodiment illustrated in Fig. 1 each pole piece consists of a pair of pole members 10, 11 fixed on the machine casing or carcase 12 by means of screws 13. The compensating winding 7 is mounted on the pole member 10 adjacent to the leading horn of the pole piece, whilst the main field winding 3 is arranged to surround both pole members 11 and 10, the latter being already surrounded by the compensating winding 7. It is therefore apparent that windings 7 and 3 may be constructed as separate units outside the dynamo thereby safeguarding their insulation against detrimental shocks, handlings and abrasion. These windings are then mounted on the pole members 10, 11 before fixing the latter on the casing 12.

Figure 4:
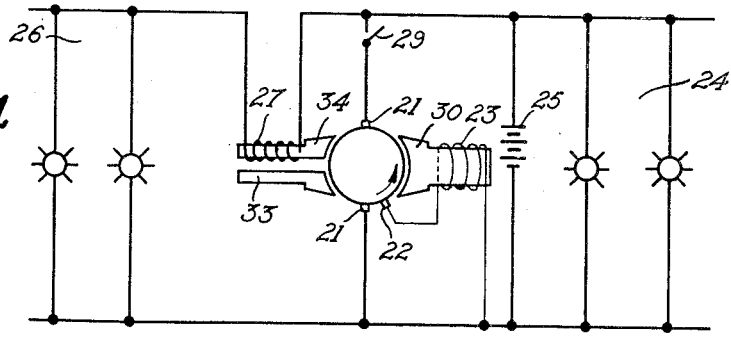
Fig. 4 is a wiring diagram of an installation using a dynamo of the type illustrated in Fig. 3.

In the embodiment illustrated in Fig. 4 the dynamo comprises main brushes 21, a third brush 22 and field windings 23. This dynamo is connected in parallel with a storage battery 25 in a first consuming circuit 24. In addition, another consuming circuit 26 is provided having mounted therein a compensation winding 27. A make-and-break device 29 is also provided for disconnecting the dynamo from both circuits 24 and 26.

Figure 3:
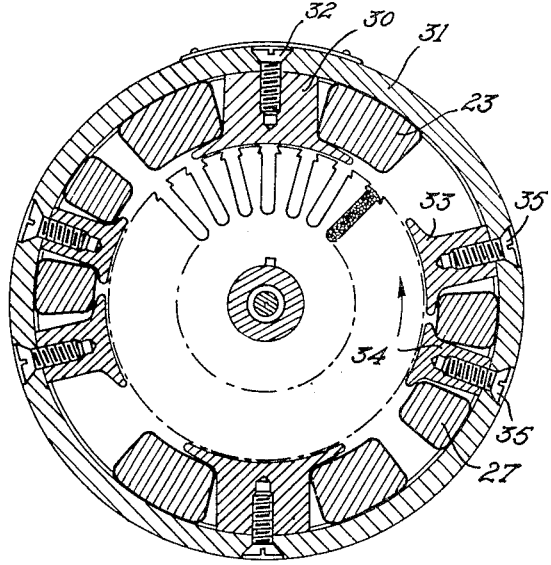
Fig. 3 is a cross-sectional view of a "three-brush" dynamo according to the invention having a relatively low power output.

Referring now to the embodiment of Fig. 3, the compensation winding 27 and the field windings 23 are mounted with consequent poles, i. e. every other pole piece 30 fixed to the casing 31 through screws 32 carries the field winding 23, whilst each intermediate pole piece consists of a pair of pole members 33, 34 fixed to the machine casing by means of screws 35, the compensating winding 27 being mounted on the pole member 34 adjacent to the leading horn of the intermediate pole piece. It will be therefore apparent that windings 23 and 27 may be constructed separately outside the dynamo and thus have a perfect electrical insulation. They are subsequently mounted on pole members 30 and 34 respectively before fixing these members on the machine casing 31.

The "three-brush" dynamo illustrated in the drawing operates exactly as described in the aforesaid U. S. Patent No. 2,084,527. It is therefore unnecessary to describe this operation.

It will be understood that the invention is not restricted to the embodiments described and illustrated herein and that many constructional and dimensional details may be modified without departing from the spirit and scope of the invention as defined in the appended claims.

What I claim is:

1. In a dynamo of the three-brush type having at least one pair of main brushes feeding a first consuming circuit containing a source of voltage and a second circuit in parallel with the first but containing no source of voltage while including a compensating winding for neutralizing that fraction of the armature transversal re-action which is due to the current flowing in said second circuit, and a third brush; the improvement which comprises pairs of consequent poles, the first pole of each pair carrying a shunt winding which interconnects the third brush and the main brush which precedes said third brush, while the second pole of each pair is formed with a slot, the compensating winding passing through said slot and surrounding the leading horn of said second pole, the shunt windings and the compensating windings for all the consequent poles being respectively connected in series.

2. In a dynamo of the three-brush type having at least one pair of main brushes feeding a first consuming circuit containing a source of voltage and a second circuit in parallel with the first but containing no source of voltage while including a compensating winding for neutralizing that fraction of the armature transversal re-action which is due to the current flowing in said second circuit, and a third brush; the improvement which comprises pairs of consequent poles, the first pole of each pair carrying a shunt winding which interconnects the third brush and the main brush which precedes said third brush, while the second pole of each pair is formed with two independent pole elements defining an interval between each other, the compensating winding only surrounding the pole element formed with the leading horn of said second pole, the shunt windings and the compensating windings for all the consequent poles being respectively connected in series.

References Cited in the file of this patent

UNITED STATES PATENTS

| | | |
|---|---|---|
| 888,050 | Stratton | May 19, 1908 |
| 2,084,527 | Guilbert | June 22, 1937 |
| 2,240,652 | Jenkins | May 6, 1941 |

FOREIGN PATENTS

| | | |
|---|---|---|
| 937,714 | France | Mar. 18, 1948 |